(12) United States Patent
Woerner et al.

(10) Patent No.: US 7,478,888 B2
(45) Date of Patent: Jan. 20, 2009

(54) ACCELERATED PRESSURE BUILD-UP

(75) Inventors: Dieter Woerner, Eppingen (DE); Michael Herges, Korntal-Muenchingen (DE); Juergen Dorsch, Ilsfeld (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/481,428

(22) PCT Filed: Jun. 14, 2002

(86) PCT No.: PCT/EP02/06553

§ 371 (c)(1),
(2), (4) Date: May 25, 2004

(87) PCT Pub. No.: WO03/000525

PCT Pub. Date: Jan. 3, 2003

(65) Prior Publication Data

US 2004/0189085 A1    Sep. 30, 2004

(30) Foreign Application Priority Data

Jun. 20, 2001    (DE) ............................... 101 29 601

(51) Int. Cl.
*B60T 8/50* (2006.01)
*B60T 8/34* (2006.01)

(52) U.S. Cl. .................... 303/118.1; 303/15; 303/40

(58) Field of Classification Search .............. 303/118.1, 303/119.2, 119.3, 119.1, 113.1, 122.15, 127, 303/40, 158, 174, 18, 9.66, 15, 14, 13, 9; 137/627.5, 596.17
See application file for complete search history.

(56) References Cited

U.S. PATENT DOCUMENTS

| | | | | | |
|---|---|---|---|---|---|
| 3,854,501 | A | * | 12/1974 | Machek | 137/627.5 |
| 3,977,734 | A | * | 8/1976 | Ronnhult et al. | 303/119.3 |
| 4,753,494 | A | * | 6/1988 | Antrobus | 303/119.3 |
| 5,927,831 | A | * | 7/1999 | Friederichs et al. | 303/158 |
| 6,238,020 | B1 | * | 5/2001 | Gronau et al. | 303/158 |
| 6,626,505 | B2 | * | 9/2003 | Frank et al. | 303/15 |
| 2004/0189085 | A1 | * | 9/2004 | Woerner et al. | 303/113.1 |

FOREIGN PATENT DOCUMENTS

| | | | |
|---|---|---|---|
| DE | 39 31 761 | A1 | 4/1991 |
| DE | 41 40 271 | A1 | 8/1993 |
| DE | 100 18 400 | C1 | 8/2001 |
| DE | 100 62 625 | A1 | 10/2001 |
| DE | 010129601 | A1 * | 1/2003 |
| WO | WO 02/087949 | A1 * | 11/2002 |
| WO | WO 03/000525 | A1 * | 1/2003 |

* cited by examiner

*Primary Examiner*—Thomas J Williams
(74) *Attorney, Agent, or Firm*—Crowell & Moring LLP

(57) ABSTRACT

An electronic vehicle service braking system having at least one braking cylinder and a pressure control module with a control chamber and a working chamber. The working chamber is connected to an air supply via a supply line, the control chamber is connected to the air supply via a connecting line and an inlet valve and to the atmosphere via an outlet valve. The control chamber is also connected to a back-up braking system via a back-up line and a back-up valve, and a control system is provided for controlling at least the inlet valve and the back-up valve. The control system controls the valves such that the back-up valve is opened together with the inlet valve, enabling air to flow into the control chamber when an ABS signal for a rise in pressure follows a drop in pressure.

7 Claims, 1 Drawing Sheet

ACCELERATED PRESSURE BUILD-UP

BACKGROUND AND SUMMARY OF THE INVENTION

The invention relates to a braking system for a vehicle including an electronic service braking system (EBS) having at least one brake cylinder and a control valve assigned to the brake cylinder (referred to herein as a pressure control module or DRM). The pressure control module comprises at least a control chamber as well as a working chamber. The working chamber is connected by way of a supply line to the air supply reservoir, and the control chamber is connected by way of an inlet solenoid valve with the air supply.

For reducing pressure, the control chamber is connected with the atmosphere by way of an outlet solenoid valve and, as required, by way of a sound absorber.

By actuating the inlet or outlet solenoid valve, a pressure defined by the electronic brake control system is controlled into the control chamber during braking. In this case, the pressure in the control chamber controls the pressure in the working chamber through the use of a relay valve mechanism.

Furthermore, the control chamber of the pressure control module is connected by way of a backup line and a backup valve with a conventional backup system, in which a pressure is applied during braking by means of a pneumatic foot brake valve. This pressure is used for nevertheless permitting braking of the vehicle when the electric pressure control fails. For this purpose, the inlet and outlet solenoid valves are closed in their non-energized condition, and the backup solenoid valve is open in its non-energized condition.

Such pressure control modules control the pressure in the brake cylinder when braking takes place during which the wheels do not tend to lock up as well as during an ABS intervention.

In the case of an ABS intervention, the pressure at the brake cylinder of the wheel tending to lock is reduced considerably. When, subsequently, the wheel starts to run again, the pressure must be raised again as fast as possible in order to again build up the maximally possible braking force at the corresponding wheel as fast as possible and, thus, minimize the braking distance of the vehicle.

In the case of electronic service braking systems used so far, air for increasing the pressure was guided into the control chamber exclusively from the supply connection by way of the inlet solenoid valve.

Particularly in the case of rapid and large pressure increases during ABS braking, this had the disadvantage that, because of the limited passage cross-section of the inlet solenoid valve, the gradient of the pressure increase was not sufficiently large.

It is therefore an object of the invention to provide a braking system which permits increasing the pressure in the control chamber during ABS braking more rapidly than in the systems known to date. According to the invention, this is achieved in that the backup valve is opened together with the inlet valve when an ABS signal demands a large and rapid pressure increase. As a result of the brief opening of the backup solenoid valve at the beginning of the pressure increase, air from the backup connection of the pressure control module can also be guided into the control chamber and, thus, a faster pressure increase can be achieved.

This achievement is possible because the brake pedal is always operated during an ABS intervention and, therefore, at the moment of the demanded pressure increase, the pressure is always higher in the backup system than in the control chamber of the pressure control module.

Since ventilation takes place by way of the cross-sections of the inlet valve, as well as the backup solenoid valve, the opening of the backup solenoid valve according to the invention achieves a significantly larger pressure gradient. This leads to a significantly faster response by the wheel brakes after an ABS-caused pressure reduction.

In a particularly preferred embodiment, the backup valve and the inlet valve are constructed as solenoid valves, particularly and preferably as proportional valves.

In addition to the braking system, the invention also provides a method of rapidly ventilating electronically controlled vehicle braking systems during ABS braking.

BRIEF DESCRIPTION OF THE DRAWINGS

The invention will be described by way of an example using the figures.

DETAILED DESCRIPTION OF THE DRAWINGS

Figure 1:
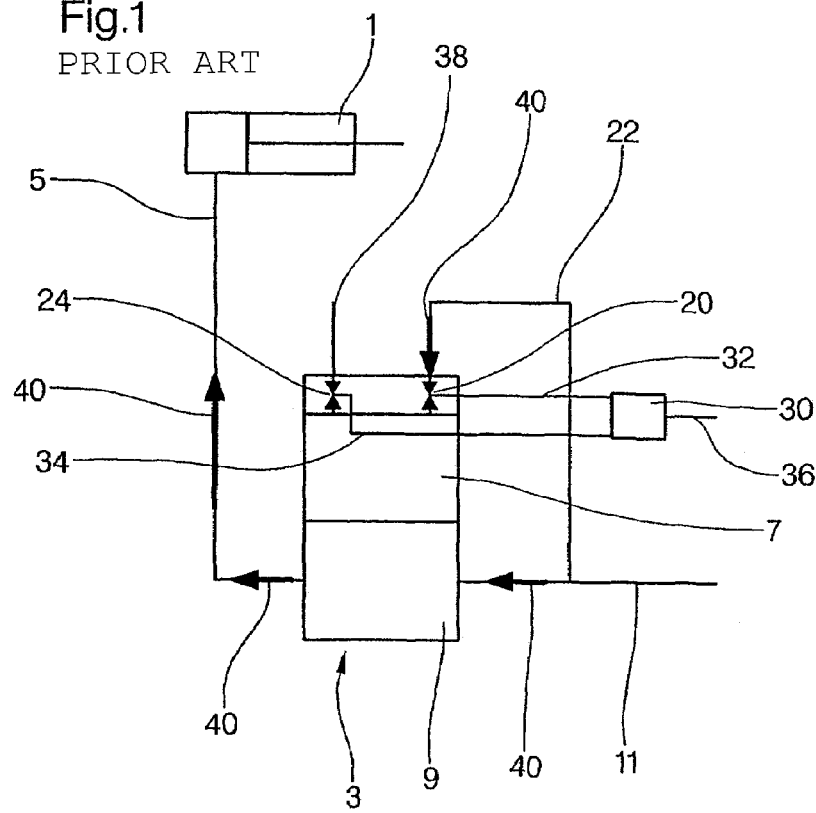
FIG. 1 is a schematic view of the construction of a part of a braking system according to the state of the art.

FIG. 1 illustrates a portion of a vehicle braking system. In the present case, the braking system is shown only for one brake cylinder of a wheel. The essence of the invention is illustrated by means of this portion of the vehicle braking system.

The service braking system comprises a brake cylinder 1, which is assigned to a wheel of the vehicle (not shown) and which is controlled by way of a pressure control module (DRM) 3. The brake cylinder 1 and the pressure control module 3 are mutually connected by way of an air conduit 5. The pressure control module 3 includes a control chamber 7 as well as a working chamber 9. By way of a conduit 11, the working chamber 9 is connected to an air supply reservoir which is not shown here. The control chamber 7 is controlled by way of an inlet solenoid valve 20, which is connected with the air supply reservoir by way of conduit 22. The solenoid valve 20 is electrically connected with a control system 30 via the electric line 32. If the brake is to be operated, for example, because the foot brake pedal is depressed by the driver, this is detected by the control system 30; a corresponding electric signal is then supplied to the solenoid valve 20 by way of Line 32; and the inlet solenoid valve 20 is controlled correspondingly, so that a predefined quantity of air arrives in the control chamber 7 by way of conduit 22. The control chamber 7, in turn, determines the air flow through the working chamber 9 and, thus, the air inflow to the brake cylinder 1. For reducing the pressure, the control chamber 7 is connected with the atmosphere by way of an outlet solenoid valve 39, which is not shown, and, as required, by a sound absorber.

During ABS braking, in the case of a pressure increase after a preceding pressure reduction, such a braking is detected by the control system 30 and the inlet solenoid valve 20 is opened again. By actuating the inlet and outlet solenoid valve, a pressure defined by the electronic brake control is controlled into the control chamber during braking.

In systems according to the state of the art, the backup solenoid valve 24, which is connected with the control system 30 by way of electric line 34, provides a pneumatic emergency braking system in the event of a failure of the electric braking system. In the systems according to the state of the art, the backup solenoid valve was therefore opened only in emergencies; that is, when the pneumatic backup brake circuit was used as an emergency brake circuit.

Figure 2:
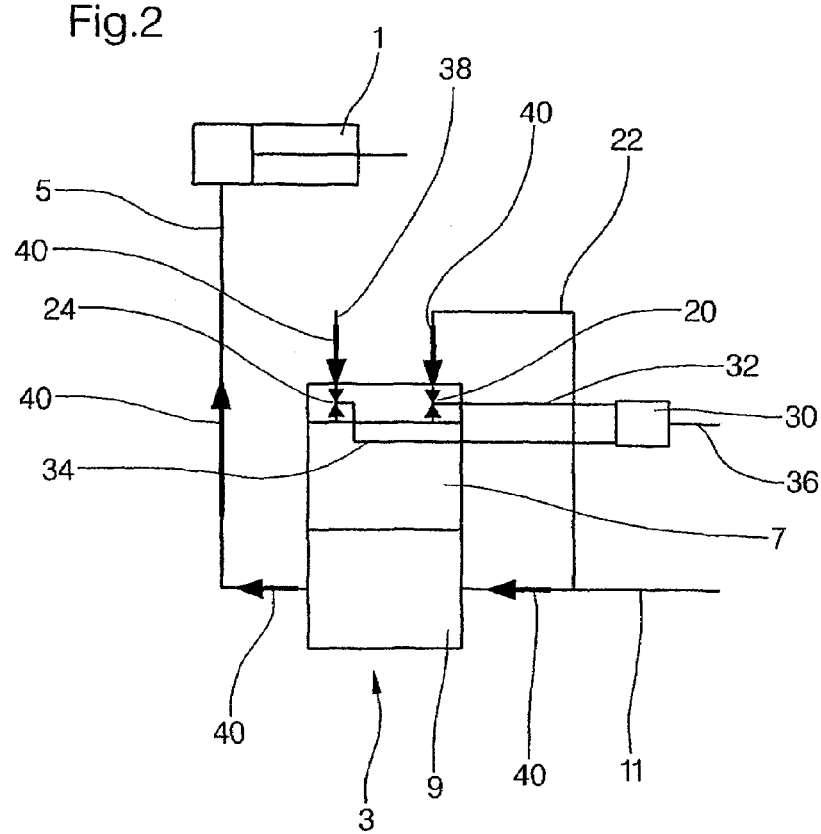
FIG. 2 is a schematic view of the construction of a braking system according to the invention.

FIG. 2 shows a braking system according to the invention. Components identical to those in FIG. 1 have the same reference numbers.

In principle, the construction in FIG. 2 is the same as in FIG. 1. However, the control system 30 includes devices for opening the backup valve 24 in the event that a signal, which indicates an ABS braking, is present at the input 36 of the control system 30. As a result of the brief opening of the backup solenoid valve 24, in addition to the inlet solenoid valve 20, according to the invention, air then flows from the backup connection 38 into the control chamber 7 of the control valve 3. Since, in such a case, the control chamber 7 is ventilated by way of the cross-section of the inlet solenoid valve 20 as well as of the backup solenoid valve 24, a significantly higher pressure gradient is reached. This means, in turn, that the pressure increase in the working chamber 9 occurs faster after a preceding pressure reduction and, thus, compressed air is fed to the brake cylinder 1 within a shorter period of time, whereby the brake cylinder 1 responds more rapidly than in the case of a system according to the state of the art, as illustrated in FIG. 1.

For purposes of explaining the invention, FIGS. 1 and 2 illustrate the air guidance during an ABS-caused pressure increase using highlighted black arrows 40.

Thus, for the first time, the present invention provides a system by which an accelerated pressure build-up can be achieved during ABS braking after a preceding pressure reduction in an electronic braking system (EBS).

TABLE OF REFERENCE NUMBERS

1 Brake cylinder
3 pressure control module (DRM)
5 conduit
7 control chamber of the pressure control module
9 working chamber of the pressure control module
11 air conduit to the air supply reservoir
20 inlet solenoid valve
22 connection conduit
24 backup solenoid valve
30 control system
32, 34 electric line to the solenoid valves 20, 24
36 input of the control unit
38 air connection to the backup solenoid valve
40 air direction during ABS braking

The invention claimed is:

1. A braking system for a vehicle, comprising:
an electronic service braking system having at least one brake cylinder and a pressure control module assigned to the brake cylinder, the pressure control module comprising a control chamber and a working chamber,
a) wherein the working chamber is connected by way of a supply conduit to an air supply;
b) wherein the control chamber is connected by way of a connection conduit and an inlet valve to the air supply;
c) wherein the control chamber is connected with the atmosphere by way of an outlet valve and is connected by way of a backup conduit and a backup valve with a backup braking system, and the backup valve and the inlet valve have essentially equal flow areas;
d) wherein the electronic service braking system further has a control system for controlling at least the inlet valve and the backup valve;
e) wherein the control system opens the backup valve together with the inlet valve such that air flows into the control chamber when there is an ABS signal for increasing the pressure after a preceding pressure reduction.

2. Braking system according to claim 1, wherein the backup valve and the inlet valve are solenoid valves.

3. Braking system according to claim 1, wherein the inlet and outlet valves are combined into a unit.

4. Braking system according to claim 2, wherein the inlet and outlet valves are combined into a unit.

5. Braking system according to claim 1, wherein the inlet valve is a proportional valve.

6. Braking system according to claim 2, wherein the inlet valve is a proportional valve.

7. Braking system according to claim 3, wherein the inlet valve is a proportional valve.

* * * * *